US008643929B2

(12) United States Patent
Gill et al.

(10) Patent No.: US 8,643,929 B2
(45) Date of Patent: Feb. 4, 2014

(54) NESTED MACH-ZEHNDER MODULATOR

(75) Inventors: Douglas M. Gill, South Orange, NJ (US); Mahmoud Rasras, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 384 days.

(21) Appl. No.: 12/685,895

(22) Filed: Jan. 12, 2010

(65) Prior Publication Data

US 2011/0170161 A1      Jul. 14, 2011

(51) Int. Cl.
*G02F 1/03* (2006.01)
*G02F 1/07* (2006.01)
*G02F 1/00* (2006.01)

(52) U.S. Cl.
USPC .......................................... 359/259; 359/237

(58) Field of Classification Search
USPC .......... 359/237, 245, 259, 278, 279; 385/2, 3, 385/14–16, 24, 39
See application file for complete search history.

(56) References Cited

U.S. PATENT DOCUMENTS

| | | | |
|---|---|---|---|
| 6,148,122 A | 11/2000 | Cao et al. | |
| 7,382,943 B1 | 6/2008 | Heaton | |
| 2002/0054294 A1 | 5/2002 | Ahmadvand et al. | |
| 2004/0150873 A1* | 8/2004 | Pearsall | 359/321 |
| 2005/0254743 A1* | 11/2005 | Akiyama et al. | 385/3 |
| 2007/0172235 A1* | 7/2007 | Snider et al. | 398/45 |
| 2008/0212915 A1* | 9/2008 | Ichikawa et al. | 385/3 |
| 2010/0040322 A1* | 2/2010 | Li et al. | 385/3 |

FOREIGN PATENT DOCUMENTS

| | | |
|---|---|---|
| DE | 4224477 A1 | 2/1993 |
| EP | 1473587 A1 | 11/2004 |
| EP | 2197165 A1 | 6/2010 |
| JP | 2009094988 A | 4/2009 |
| WO | WO 2009/054883 A1 | 4/2009 |
| WO | 2009113128 A1 | 9/2009 |

OTHER PUBLICATIONS

PCT International Search Report, PCT/US2011/020203, International Filing Date Jan. 5, 2011, Date of mailing Sep. 7, 2011.
Korean Laid-open (unexamined) Patent Publication KR 10-2000-0023464, Apr. 25, 2000, pp. 14-1-14-14.
Korea Laid-Open (unexamined) Patent Publication KR 10-2000-0023474 A, Apr. 25, 2000, pp. 8-1-8-8.
Supplementary European Search Report for EP 11733204, mailed Oct. 18, 2013.

* cited by examiner

*Primary Examiner* — Mahidere Sahle
(74) *Attorney, Agent, or Firm* — J. F. M$^c$Cabe

(57) ABSTRACT

An apparatus includes an optical splitter, an optical intensity combiner, first and second Mach-Zehnder interferometers, and first and second drive electrodes. The first Mach-Zehnder interferometer connects a first optical output of the optical intensity splitter to a first optical input of the optical intensity combiner. The second Mach-Zehnder interferometer connects a second optical output of the optical intensity splitter to a second optical input of the optical intensity combiner. The first drive electrode is located between and connected to a pair of semiconductor junctions along first internal optical arms of the Mach-Zehnder interferometers. The second drive electrode is located between and connected to a pair of semiconductor junctions along second internal optical arms of the Mach-Zehnder interferometers.

16 Claims, 6 Drawing Sheets

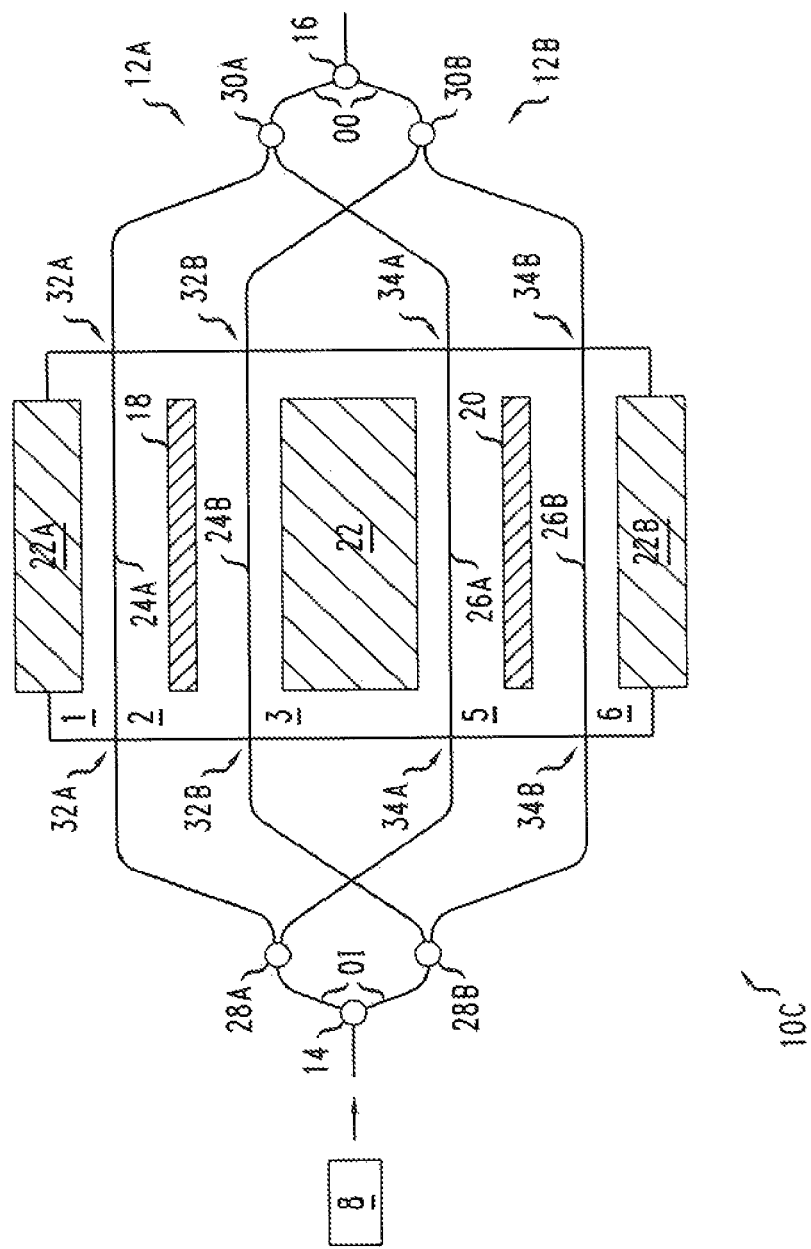

FIG. 3

```
                                                    ┌─ 72
┌──────────────────────────────────────────────┐
│  RECEIVE AN OPTIONAL CARRIER AT OPTIONAL INPUTS OF A │
│    NESTED PAIR OF MACH-ZEHNDER INTERFEROMETERS       │
└──────────────────────────────────────────────┘
                        │                           ┌─ 74
┌──────────────────────────────────────────────┐
│  ELECTRICALLY DRIVE SEMICONDUCTOR JUNCTIONS IN │
│  THE TWO INTERNAL OPTICAL ARMS OF EACH MZI TO  │
│  MODULATE A STREAM OF DATA SYMBOLS ONTO THE    │
│     RECEIVED OPTICAL CARRIER SUCH THAT EACH    │
│    SEMICONDUCTOR JUNCTION REMAINS IN THE SAME  │
│     BIASING-MODE AS THE OTHER SEMICONDUCTOR    │
│     JUNCTIONS ALONG THE INTERNAL OPTICAL ARMS  │
└──────────────────────────────────────────────┘
```

$\big\rbrace$ 70

NESTED MACH-ZEHNDER MODULATOR

BACKGROUND

1. Technical Field

The inventions relate to electro-optical modulators and methods of operating electro-optical modulators.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

Some optical modulators are based on a Mach-Zehnder interferometer (MZI) that is configured for push-pull operation. For push-pull operation, both of the internal optical branches of the MZI has an optical phase shifter thereon, and the optical phase shifters are operated together to modulate data onto an optical carrier in the MZI. The optical phase shifters can be operated together to cause relative phase shifts between light output by the two internal optical branches such that said light interferes in an output optical coupler to form a $0^{th}$ order or fundamental optical propagation mode for which the output waveguide attached thereto guides the light to an output of the MZI. In such a configuration, the interfered light may propagate to an optical circuit attached to the output of the MZI, and the MZI is in an 'ON' state. Alternately, the optical phase shifters can be operated together to cause the relative phase shifts between light output by the two internal optical branches such that said light interferes in the output optical coupler to form a $1^{st}$ order optical propagation mode for which the output waveguide will not guide the interfered light to the output of the MZI. In such a configuration, the interfered light typically does not substantially propagate to an optical circuit attached to the output of the MZI, and the MZI is in an 'OFF' state. In the 'ON' state, light from the internal optical branches can be referred to as constructively interfering within the MZI, and in the 'OFF' state, light from the internal optical branches may be referred to as destructively interfering in the MZI.

In some push-pull operated MZIs, the same central electrode drives both optical phase shifters of the two internal optical branches of the MZI. In particular, the central electrode can cause optical phase shifts of opposite sign in the two internal optical branches. To simultaneously generate phase shifts of opposite sign, the central electrode may forward bias a semiconductor junction in one internal optical branch of the MZI and simultaneously reverse bias a semiconductor junction in the other internal optical branch of the MZI. For example, a voltage applied to the central electrode can produce a phase shift of about $\pi/2$ in one internal optical branch and simultaneously produce a phase shift of about $-\pi/2$ in the other internal optical branch.

Such push-pull methods of operation can provide advantages over non-push-pull methods of operation. For example, push-pull operation can lower the average energy consumption by an MZI during operation as an optical amplitude modulator. That is, push-pull operation may be performed with lower control voltages than non-push-pull operation so that time-averaged operating powers are lower when an MZI-based optical modulator is push-pull operated than when a MZI-based optical modulator is operated by modulating a voltage to a single optical phase shifter.

BRIEF SUMMARY

Some embodiments of apparatus and methods provide better power efficiency, smaller foot prints, and/or more linear responses in optical modulators having two drive electrodes. Some such optical modulators may have such desirable properties when fabricated in lightwave circuit technologies having an asymmetric temporal electro-optic response or in CMOS compatible optical modulators with asymmetric temporal carrier dynamics. Such optical modulators may be used in transmitters that implement a QPSK modulation format or an amplitude modulation format.

One embodiment provides an apparatus that includes an optical splitter, an optical intensity combiner, first and second Mach-Zehnder interferometers, and first and second drive electrodes. The first Mach-Zehnder interferometer connects a first optical output of the optical intensity splitter to a first optical input of the optical intensity combiner. The second Mach-Zehnder interferometer connects a second optical output of the optical intensity splitter to a second optical input of the optical intensity combiner. The first drive electrode is located between and connected to a pair of semiconductor junctions along first internal optical arms of the Mach-Zehnder interferometers. The second drive electrode is located between and connected to a pair of semiconductor junctions along second internal optical arms of the Mach-Zehnder interferometers.

In some embodiments of the apparatus, the first drive electrode is able to drive the semiconductor junctions of the first pair in a reverse-biased mode.

In alternate embodiments of the apparatus, the first drive electrode is able to drive the semiconductor junctions of the first pair in a forward-biased mode.

In some embodiments of the apparatus, the first and second drive electrodes are configured to drive the semiconductor junctions of the pairs in a reverse-biased mode.

In alternate embodiments of the apparatus, the first and second drive electrodes are configured to drive the semiconductor junctions in a forward-biased mode.

In some embodiments of the apparatus, the Mach-Zehnder interferometers, the drive electrodes, the optical intensity splitter, and the optical intensity combiner are in an integrated optical device, e.g., a planar optical device.

In some embodiments, each drive electrode is in contact with same dopant-type first regions of a pair of semiconductor junctions, and the apparatus includes other electrodes located lateral to and in contact with same dopant-type second regions of the pairs of semiconductor junctions. The first and second drive electrodes may be in contact with first regions having a same dopant-type or having an opposite dopant-type.

In some embodiments of the apparatus, optical cores of optical waveguides of the Mach-Zehnder interferometers, the optical intensity splitter, and the optical intensity combiner include silicon ribs.

An embodiment of a method involves operating an optical modulator. The method includes receiving an optical carrier at optical inputs of a nested pair of Mach-Zehnder interferometers. The method includes electrically driving semiconductor junctions in two internal optical arms of each Mach-Zehnder interferometer to modulate a stream of data symbols onto the received optical carrier.

The electrically driving is performed such that each semiconductor junction remains in a biasing state of the other of the semiconductor junctions. The biasing state is either forward-biased or reverse biased.

In some embodiments of the method, the electrically driving includes driving the semiconductor junctions of each Mach-Zehnder interferometer in a push-pull configuration. In some such embodiments, the electrically driving includes applying a complement of a data signal, e.g., commonly referred to as a data-bar signal, to a first drive electrode when the data signal is applied to a second drive electrode. Each drive electrode is located between and connected to a pair of the semiconductor junctions. In other such embodiments, the electrically driving includes applying a voltage to a first drive electrode when a voltage of opposite sign is applied to a second drive electrode, wherein each drive electrode is located between and connected to a pair of the semiconductor junctions.

BRIEF DESCRIPTION OF THE DRAWINGS

FIGS. 1A-1D are top views of several embodiments of optical modulators that include nested pairs of Mach-Zehnder interferometers (MZIs);

FIG. 3 is a flow chart illustrating a method of operating an optical modulator that has a nested pair of MZIs, e.g., the optical modulators of FIGS. 1A-1D.

In the Figures and text, like reference symbols indicate elements with similar or the same function and/or structure.

In the Figures, relative dimensions of some features may be exaggerated to more clearly illustrate the features and/or their relation to other elements therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Some common semiconductor junctions, e.g., doped silicon junctions, have different, maximum operating speeds when operated in reverse-biased and forward-biased modes. Typically, forward-biased operation provides a relatively higher drive-voltage responsivity and a relatively lower bandwidth than reverse-biased operation. Due to the dependence of such properties on biasing-mode, an optical modulator may have undesirable operating properties if the optical modulator is configured to have both forward-biased and reverse-biased semiconductor junctions therein. For example, both the bandwidth and drive-voltage responsivity of such an optical modulator may be limited. Unfortunately, some push-pull MZI-based optical modulators are configured to produce such a mixing of biasing-modes among the semiconductor junctions therein. Herein, various embodiments illustrate optical modulators configured to avoid such mixed biasing-mode configurations while still providing a push-pull operation.

FIGS. 1A-1D illustrate optical modulators 10A, 10B, 10C, 10D with nested MZIs 12A, 12B. The optical modulators 10A-10D may phase and/or amplitude modulate a stream of digital data onto light from a coherent light source 8, e.g., a laser that outputs light at a telecommunications wavelength.

In FIGS. 1A-1D, boxes 1, 2, 3, 4, 5, 6 schematically indicate p-type (P) and n-type (N) doped semiconductor regions, and heavy black lines schematically indicate cores or core ribs of optical waveguides. In the optical modulators 10A-10D, regions of semiconductor junctions 32A, 32B, 34A, 34B are located in the cores of the optical waveguides that are schematically indicated by the heavy black lines. The edges of the boxes 1-6, which are associated with the semiconductor junctions 32A, 32B, 34A, 34B, are not separately indicated in FIGS. 1A-1D.

Figure 1A:
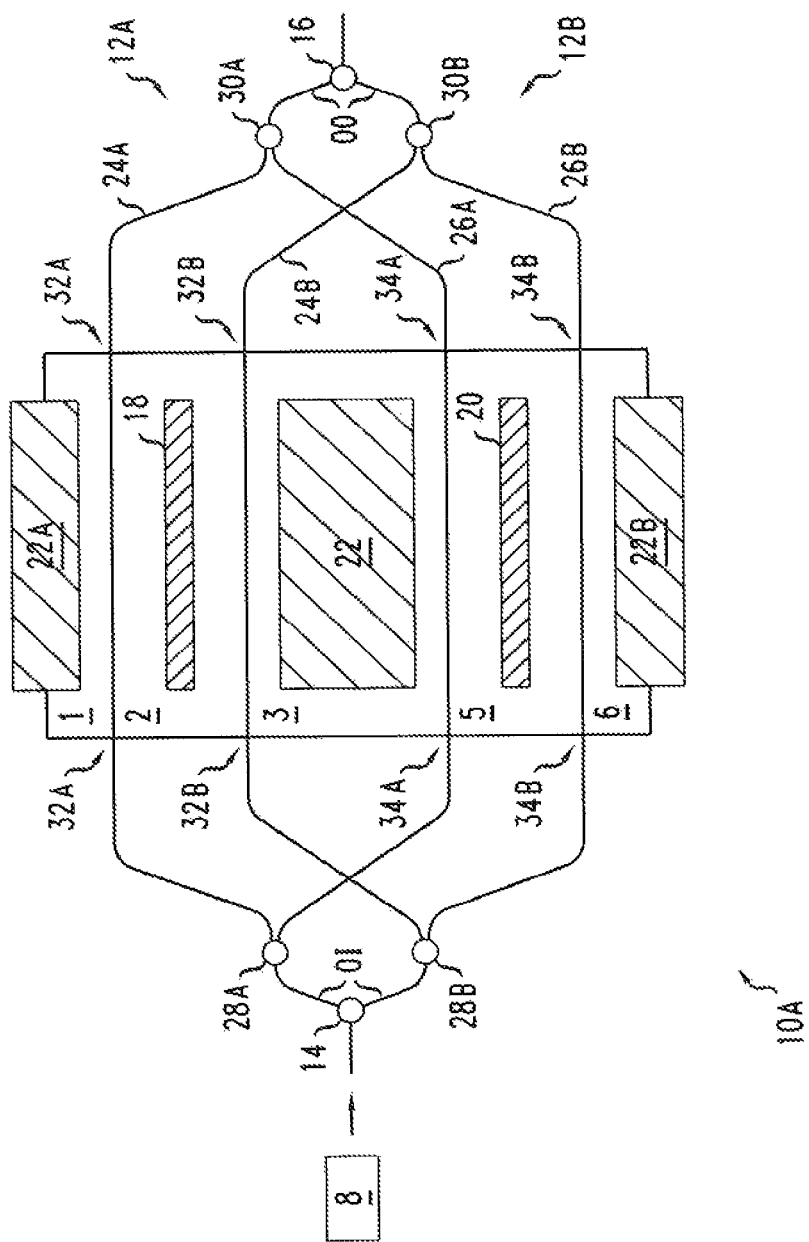
Figure 1B:
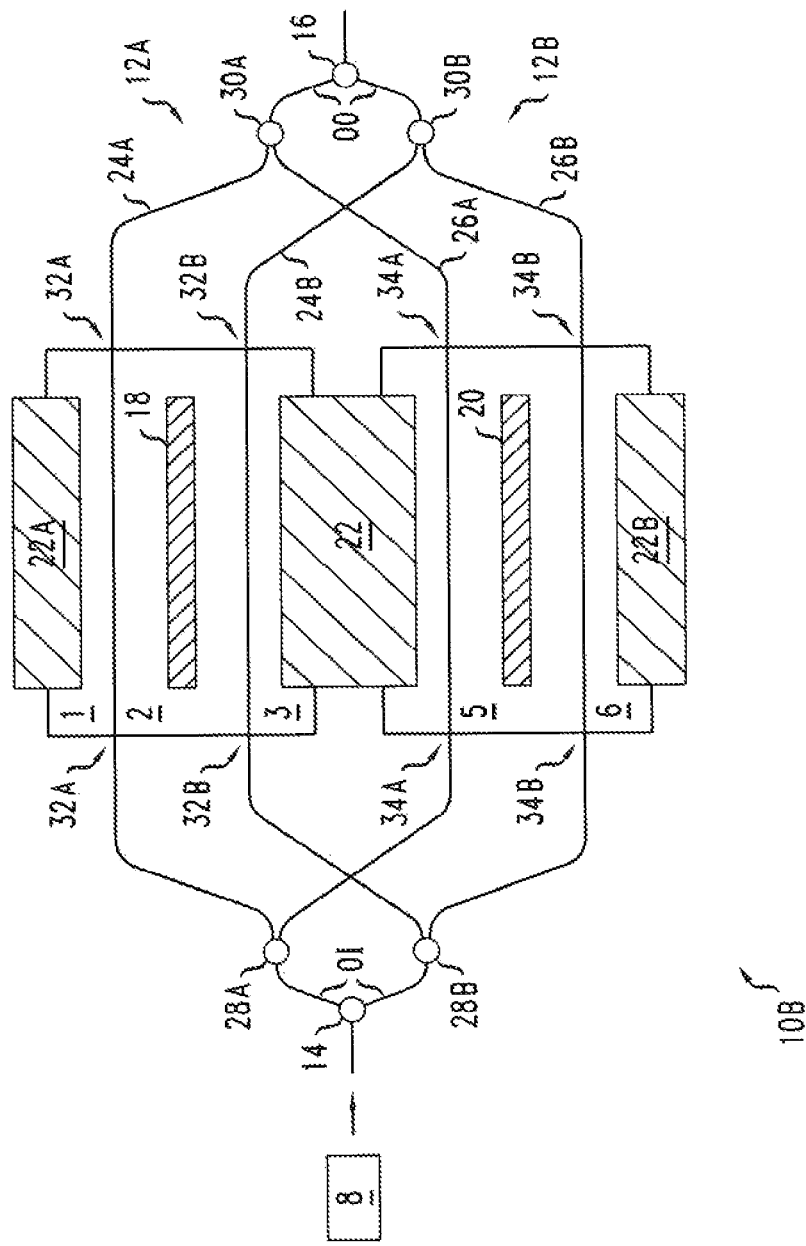
Figure 1D:
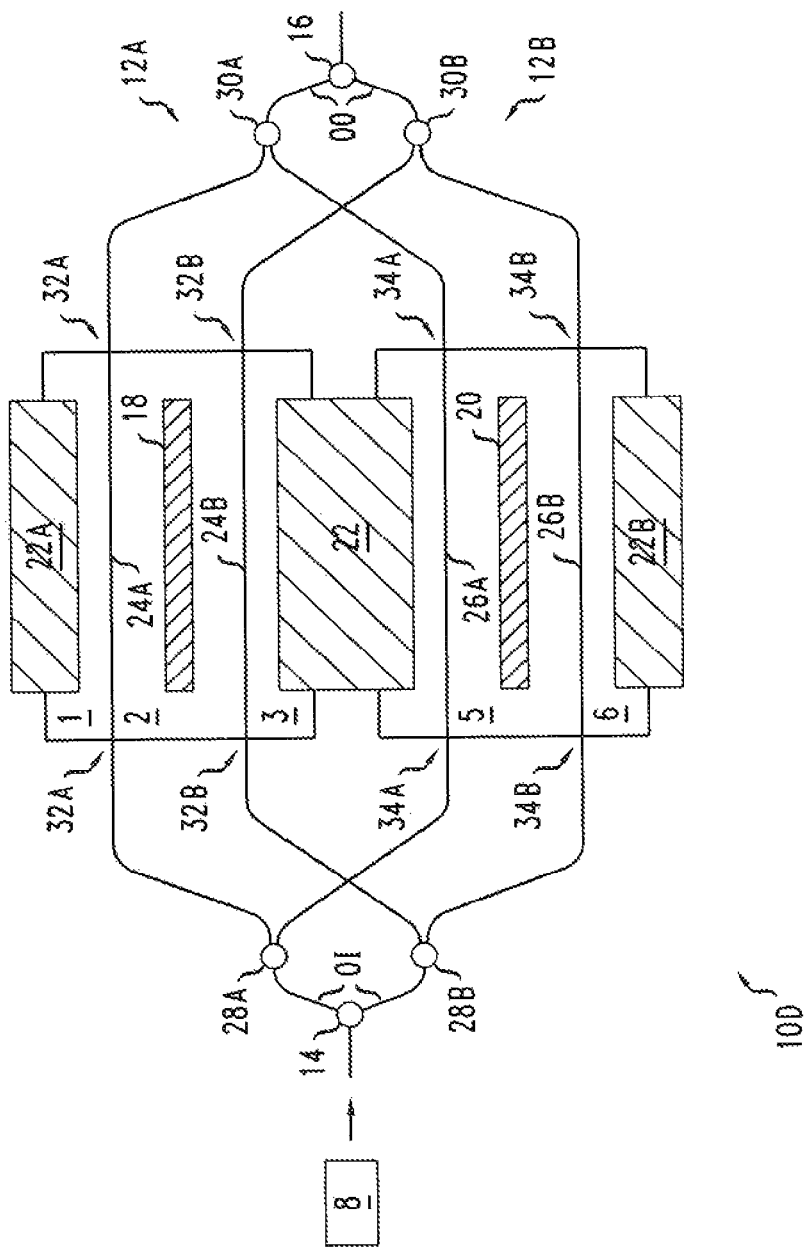

Referring to FIGS. 1A-1D, the optical modulators 10A-10D have different semiconductor junctions 32A, 32B, 34A, 34B in the optical waveguides thereof and/or have different relative arrangements of the semiconductor junctions 32A, 32B, 34A, 34B. In FIGS. 1A-1B, the semiconductor junctions 32A, 32B, 34A, 34B of the optical modulators 10A-10B are P/intrinsic (I)/N junctions, i.e., PIN junctions. In FIGS. 1C-1D, the semiconductor junctions 32A, 32B, 34A, 34B of the optical modulators 10C-10D are PN junctions. In FIGS. 1A and 1C, doping of the sequence of the semiconductor regions 1, 2, 3, 5, and 6 is described by either the dopant-type sequence P, N, P, N, P or the dopant-type sequence N, P, N, P, N. In FIGS. 1B and 1D, doping of the sequence of the semiconductor regions 1, 2, 3, 4, 5, and 6 is described by either the dopant-type sequence P, N, P, N, P, N or the dopant-type sequence N, P, N, P, N, P.

Referring to FIGS. 1A-1D, each optical modulator 10A-10D includes the pair of MZIs 12A, 12B, an optical intensity splitter 14, an optical intensity combiner 16, drive electrodes 18, 20, and ground electrodes 22, 22A, 22B. Each MZI 12A, 12B has an optical input (OI) that directly connects to a corresponding optical output of the optical intensity splitter 14 and has an optical output (OO) that directly connects to a corresponding optical input of the optical intensity combiner 16. The optical intensity splitter 14 and the optical intensity combiner 16 may be, e.g., conventional 50/50 optical intensity couplers or asymmetric and/or tunable optical intensity couplers.

In the optical modulators 10A-10D, each MZI 12A, 12B includes a pair of internal optical arms (24A, 26A), (24B, 26B), i.e., optical waveguides; a 1×2 optical intensity splitter 28A, 28B; and a 2×1 optical intensity combiner 30A, 30B. Each internal optical arm 24A, 26A, 24B, 26B has an optical phase shifter along a segment thereof. Each optical phase shifter includes the semiconductor junction 32A, 32B, 34A, 34B and a pair of operating electrodes, i.e., the drive-ground electrode pairs (18, 22A), (18, 22), (20, 22), and (20, 22B). The electrodes 18, 20, 22, 22A, 22B apply voltages across the semiconductor junctions 32A, 32B, 34A, 34B to control the optical phase shifters along the internal optical arms of each MZI 12A, 12B.

Each semiconductor junction 32A, 32B, 34A, 34B is a P-type (P)/intrinsic (I)/N-type (N) junction or a P/N junction as already discussed. The semiconductor junctions 32A, 32B, 34A, 34B are laterally arranged into two disjoint back-to-back junction pairs (32A, 32B) and (34A, 34B). Each back-to-back junction pair (32A, 32B), (34A, 34B) forms a P,I,N, N,I,P; an N,I,P,P,I,N; a P,N,N,P; or an N,P,P,N sequence of doped semiconductor layers. Each back-to-back junction pair (32A, 32B), (34A, 34B) may be driven by a voltage signal applied to the single drive electrode 18, 20 centrally located between the semiconductor junctions 32A, 32B, 34A, 34B thereof, i.e., in a configuration where the other electrodes 22, 22A, 22B are grounded. In such configurations, each centrally located, drive electrode 18, 20 operates the optical phase shifters along a pair of internal optical arms, i.e., along the paired optical waveguides (24A, 24B) or the paired optical waveguides (26A, 26B). That is, in such a configuration, each centrally located, drive electrode 18, 20 operates an optical phase shifter of both MZIs 12A, 12B.

The lateral dopant distributions in the junction pairs (32A, 32B), (34A, 34B) are configured to enable operation of the four semiconductor junctions 32A, 32B, 34A, 34B in the same biasing-mode, i.e., a forward-biased mode or a reverse-biased mode. For that reason, each disjoint junction pair (32A, 32B), (34A, 34B) is doped so that each centrally located, drive electrode 18, 20 directly contacts only a single type of dopant region of the semiconductor junctions 32A, 32B, 34A, 34B, i.e., either p-type or n-type, but not both p-type and n-type. In some embodiments, the driving and ground electrodes 18, 20, 22, 22A, 22B may be electrically connected to cause forward-biasing of the four semiconductor junctions 32A, 32B, 34A, 34B. In other embodiments, the driving and ground electrodes 18, 20, 22, 22A, 22B may be configured to cause reverse-biasing of the four semiconductor junctions 32A, 32B, 34A, 34B.

That is, the configuration of the semiconductor junctions 32A, 32B, 34A, 34B and electrodes 18, 20 is designed to avoid mixing reverse-biasing and forward-biasing of semiconductor junctions during operation of the optical modulators 10A-10D.

Some specific embodiments of the optical modulators 10A-10D are integrated opto-electronics devices, e.g., planar devices. Integrated, planar, opto-electronics devices may be fabricated, e.g., from commercially available silicon on insulator (SOI) substrates with conventional processes known to persons of ordinary skill in the art.

Figure 2:
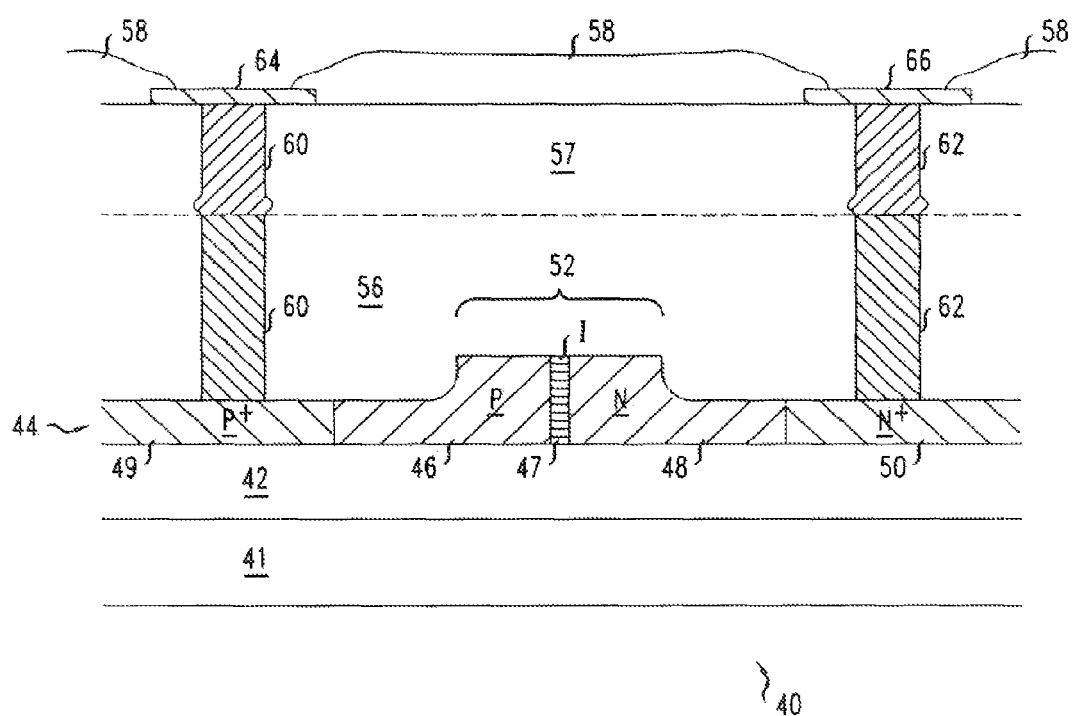
FIG. 2 is a cross-sectional view illustrating a specific embodiment of an optical modulator, e.g., the optical modulators of FIGS. 1A-1B.

FIG. 2 illustrates one such optical modulator 40 in which the optical and electrical elements may be arranged as in the optical modulator 10A of FIG. 1A or as in the optical modulator 10B of FIG. 1B. In particular, the optical modulator 40 includes the nested pair of MZIs 12A, 12B; the optical intensity splitter 14; the optical intensity combiner 16; the electrodes 18, 20, 22, 22A, 22B; and the doped semiconductor regions 1-6 as illustrated in FIG. 1A or 1B.

FIG. 2 illustrates a portion of the optical modulator 40. The illustrated portion includes one optical phase shifter one of the nested MZIs 12A, 12B of the optical modulator 40. More generally, FIG. 2 also illustrates the planar layer structure of various optical and electrical elements in the optical modulator 40.

The optical modulator 40 includes a substrate 41, with an insulator layer 42 thereon and includes a silicon layer 44 located on the insulator substrate layer 42. The combination of the substrate 41, the insulator layer 42, and the silicon layer 44 may be produced by doping and etching a top silicon layer of a commercially available SOI-substrate.

With respect to the doping, the silicon layer 44 may be doped via conventional processes, e.g., ion implantation(s) and activating thermal anneal(s). These processes form a semiconductor junction with P, I, and N regions 46, 47, 48 and heavily doped and laterally located P$^+$ and N$^+$ electrical contact regions 49, 50. The P and N regions 46, 48 may have $2 \times 10^{16}$ to $10^{19}$ P and N dopant atoms per centimeter-cubed (cm$^3$), respectively, and may be doped in a homogeneous manner or a graded manner. The P$^+$ and N$^+$ regions 49, 50 may have $5 \times 10^{18}$ to $1 \times 10^{21}$ P and N dopant atoms per cm$^3$, respectively. The I region 47 may have a dopant density of about $3 \times 10^{15}$ or less dopant atoms per cm$^3$, i.e., an unintentional density of dopant atoms, and may have a width of between about 20 and 1500 nanometers (nm).

With respect to the etching, the doped silicon layer 44 or the yet to be doped top silicon layer of an SOI-substrate may be etched via a conventional process, e.g., an anisotropic reactive ion etch. The etching forms ridges 52 for optical waveguide cores and planar legions of optical intensity couplers, e.g., the optical couplers 14, 16, 28A, 28B, 30A, 30B illustrated in FIG. 1A or 1B. The PIN semiconductor junctions are typically located in the ridges 52 for the optical waveguide cores, i.e., as illustrated in FIG. 2.

In an optical phase shifter for light of the telecommunications C-hand, the anisotropic etching of the SOI-substrate may produce features in the dopant patterned lateral regions 46-50 with the following dimensions. The ridge 52 may have a thickness of about 100 to 500 nanometers (nm) and width of about 200 nm to 800 nm. The semiconductor regions 46-50 lateral to the ridge 52 may be about 80% to 10% as thick as silicon layer 44 in the ridge 52. The thinner portions of the P and N regions 46, 48 may have widths of about 100 to 1,000 nm. The heavily doped P$^+$ and N$^+$ regions 49, 50 may have about the same thickness as the portions of the P and N regions 46, 48 lateral to the ridge 52.

The optical modulator 40 may include, e.g., one or more dielectric optical cladding layers 56, 57 located on the doped and etched silicon layer 44 and may include a thin dielectric passivation dielectric layer 58 located on the one or more dielectric optical cladding layers 56, 57. The dielectric optical cladding and passivation layers 56-58 may be, e.g., transparent oxide layers, which are grown and/or deposited via conventional processes, and/or layer(s) of other dielectrics known to be useful for photonics devices.

The optical modulator 40 includes metal electrodes 60, 62 that are in physical contact with the P$^+$ and N$^+$ electrical contact regions 49, 50 and in some regions are located over and the P$^+$ and N$^+$ electrical contact regions 49, 50. The metal electrodes 60, 62 may be parts of the electrodes 18, 20, 22, 22A, 22B that control the optical phase shifters of FIGS. 1A-1B. The metal electrodes 60, 62 may be formed by etching a via in each dielectric layer 56, 57 and then, forming tungsten and/or aluminum contacts in the via with a conventional micro-electronics processing method. The etching may be aligned, e.g., so that the metal electrodes 60, 62 are shifted laterally from the neighboring edges of the P and N regions 46, 48 by about 50 nm to about 800 nm. In some embodiments, a silicide may also be formed on exposed portions of the P$^+$ and N$^+$ electrical contact regions 49, 50 prior to the deposition of metal for the metal electrodes 60, 62.

The optical modulator 40 may also include top metal layers 64, 66 on the metal electrodes 60, 62. Portions of surfaces of the top metal layers 64, 66 may be exposed through the dielectric passivation layer 58 to provide regions for forming conventional wire bond connections (not shown) to the top metal layers 64, 66 of the metal electrodes 60, 62.

FIG. 3 illustrates a method 70 for push-pull operation of an optical modulator with nested MZIs, e.g., the optical modulators 10A-10D, 40 of FIGS. 1A-1D and 2.

The method 70 includes receiving an optical carrier at optical inputs of the MZIs of a nested pair (step 72). For example, the optical carrier may be an unmodulated and collimated continuous-wave coherent light beam received from a laser 8 as illustrated in FIGS. 1A-1D. Alternately, the optical carrier may be a coherent light beam that is received from another optical modulator. The MZIs may be the MZIs 12A, 12B of FIGS. 1A, 1B, 1C, and 1D, which receive the optical carrier from the optical outputs of the optical intensity splitter 14.

The method 70 includes electrically driving semiconductor junctions in the two internal optical arms of each MZI to modulate a stream of data symbols onto the received optical carrier (step 74). For example, the semiconductor junctions may be the PIN or PN junctions 32A, 32B, 34A, 34B, which are illustrated in FIGS. 1A-1D and are driven via the drive and ground electrodes 18, 20, 22, 22A, 22B, e.g., PIN junctions as illustrated in FIG. 2. The step 74 of electrically driving is performed such that each semiconductor junction remains in the same single biasing state as the other semiconductor junctions of the MZIs. For example, either the semiconductor junctions of the MZIs may remain forward-biased during the step 74 of electrically driving, or the semiconductor junctions of the MZIs may remain reverse-biased during the step 74 of electrically driving.

In some embodiments, the push-pull modulation method 70 involves applying a complement of a data signal to one central drive electrode when the data signal is applied to the other central drive electrode, e.g., the drive electrodes 18, 20 of FIGS. 1A-1D. In binary amplitude and binary phase modulation formats, the complement of a data signal for logical 1 is the data signal for logical 0. For example, in the optical modulators 10A-10D of FIGS. 1A-1D, a stream of data signals may be applied to the central drive electrode 18 while the complements of the same data signals are simultaneously applied to the other central drive electrode 20. During the step 74 of electrically driving, the electrodes 22, 22A, 22B may be maintained at a single ground potential in some such embodiments.

In some such embodiments of the push-pull modulation method 70, a direct current (DC) biasing voltage may also be applied to the drive electrode(s) 18, 20 to ensure that the biasing of the semiconductor junctions 32A, 32B, 34A, 34B does not change biasing-type when data signals vary between the signal for logical 1 and the signal for logical 0. That is, the PN and/or PIN semiconductor junctions in optical phase shifters are DC biased to not shift between the forward-biased and reverse-biased modes during the step 74 of electrically driving.

The various embodiments of such push-pull operation methods are typically configured to account for intrinsic biases of the PN and/or PIN semiconductor junctions in the optical phase shifters of the MZIs. The intrinsic bias is the maximum magnitude of a bias voltage for which a PIN or PN semiconductor junction will only carry a nominally small current while biased by a voltage of the appropriate sign for forward-biasing. That is, biasing a PN or PIN semiconductor junction with a voltage whose magnitude is smaller than the intrinsic bias voltage will cause the PN or PIN semiconductor junction to operate in the reverse-biased mode.

For example, if an embodiment of the push-pull method 70 is configured to operate the PIN and/or PN semiconductor junctions in optical phase shifters in a forward-biased mode, the embodiment involves applying voltages across said semiconductor junctions with magnitudes larger than the intrinsic bias voltages of said semiconductor junctions.

In alternate embodiments, the push-pull modulation method 70 involves applying a voltage to one central drive electrode while simultaneously applying a voltage of opposite sign to the other central drive electrode. For example, in such embodiments for operating the optical modulators 10A-10D of FIGS. 1A-1D, when a voltage is applied to the central drive electrode 18 an opposite sign voltage may be applied simultaneously to the central drive electrode 20 while the remaining electrodes 22, 22A, 22B are maintained at a ground voltage. The opposite sign voltages may have about equal magnitudes or may be opposite sign voltages of unequal magnitudes if a transmission with a larger chirp is desired. During such embodiments of the step 74 of electrically driving, the electrodes 22, 22A, 22B may again be maintained at a common ground potential. In such embodiments of the push-pull modulation method 70, the optical modulators 10A-10D may be driven between states with different amounts of voltage biasing by the drive electrodes 18, without causing any semiconductor junction of an optical phase shifter, e.g., the junctions 32A, 32B, 34A, 34B, to undergo a transformation between the forward-biased mode of operation and the reverse-biased mode of operation.

In FIGS. 10A-10D, the doped semiconductor layers 1-6 of the various semiconductor junctions 32A, 32B, 34A, 34B are shown as being laterally separated, e.g., along a planar surface of a substrate. Nevertheless, from the present disclosure, a person of ordinary skill in the art would readily recognize that alternate embodiments exist. In some such alternate embodiments, said semiconductor junctions 32A, 32B, 34A, 34B may be replaced by semiconductor junctions in which the differently doped semiconductor layers are vertically stacked over the planar surface of a substrate rather than laterally separated there along. In such alternate embodiments, a back-to-back pair of semiconductor junctions driven by the same central drive electrode may be formed in the same vertical stack over the surface of the substrate or may be formed in laterally adjacent vertical stacks over the surface of the substrate.

From the disclosure, drawings, and claims, other embodiments of the invention will be apparent to those skilled in the art.

What is claimed is:

1. An apparatus, comprising:
    an optical intensity splitter having first and second optical outputs;
    an optical intensity combiner having first and second optical inputs;
    a first a Mach-Zehnder interferometer connecting the first optical output to the first optical input;
    a second Mach-Zehnder interferometer connecting the second optical output to the second optical input; and
    a first drive electrode located between and connected to a first pair of semiconductor junctions, the semiconductor junctions of the first pair being located along and in first internal optical waveguides of the Mach-Zehnder interferometers; and
    a second drive electrode located between and connected to a second pair of semiconductor junctions, the semiconductor junctions of the second pair being located along and in second internal optical waveguides of the Mach-Zehnder interferometers.

2. The apparatus of claim 1, wherein the first drive electrode is able to drive the semiconductor junctions of the first pair in a reverse-biased mode.

3. The apparatus of claim 1, wherein the first drive electrode is able to drive the semiconductor junctions of the first pair in a forward-biased mode.

4. The apparatus of claim 1, wherein the first and second drive electrodes are configured to drive the semiconductor junctions of the pairs in a reverse-biased mode.

5. The apparatus of claim 1, wherein the first and second drive electrodes are configured to drive the semiconductor junctions in a forward-biased mode.

6. The apparatus of claim 1, wherein the Mach-Zehnder interferometers, the electrodes, the optical intensity splitter, and the optical intensity combiner are in an integrated optical device.

7. The apparatus of claim 6,
    wherein each drive electrode is in contact with first regions of a same dopant type of a pair of semiconductor junctions; and
    wherein the apparatus further comprises electrodes located lateral to and in contact with same dopant-type second regions of each pair of semiconductor junctions.

8. The apparatus of claim 7, wherein the first and second drive electrodes are in contact with semiconductor regions having a same dopant type.

9. The apparatus of claim 7, wherein the first and second drive electrodes are in contact with semiconductor regions having an opposite dopant type.

10. The apparatus of claim 6, wherein optical cores of optical waveguides of the Mach-Zehnder interferometers, the optical intensity splitter, and the optical intensity combiner include silicon ribs.

11. A method of operating an optical modulator, comprising:
   receiving an optical carrier at optical inputs of Mach-Zehnder interferometers of a nested pair thereof; and
   electrically driving semiconductor junctions located in two internal optical waveguides of each Mach-Zehnder interferometer to modulate a stream of data symbols onto the received optical carrier; and
   wherein the electrically driving is such that each semiconductor junction remains in a biasing state of the other of the semiconductor junctions, the biasing state being forward-biased or reverse biased.

12. The method of claim 11, wherein the biasing state is forward-biased.

13. The method of claim 11, wherein the biasing state is reverse-biased.

14. The method of claim 11, wherein the electrically driving includes driving the semiconductor junctions of each Mach-Zehnder interferometer in a push-pull configuration.

15. The method of claim 14, wherein the electrically driving includes applying a complement of a data signal to a first central electrode when the data signal is applied to a second central electrode, each central drive electrode being located between and connected to a pair of the semiconductor junctions.

16. The method of claim 14, wherein the electrically driving includes applying a voltage to a first central electrode when a voltage of opposite sign is applied to a second central electrode, each central drive electrode being located between and connected to a pair of the semiconductor junctions.

* * * * *